UNITED STATES PATENT OFFICE.

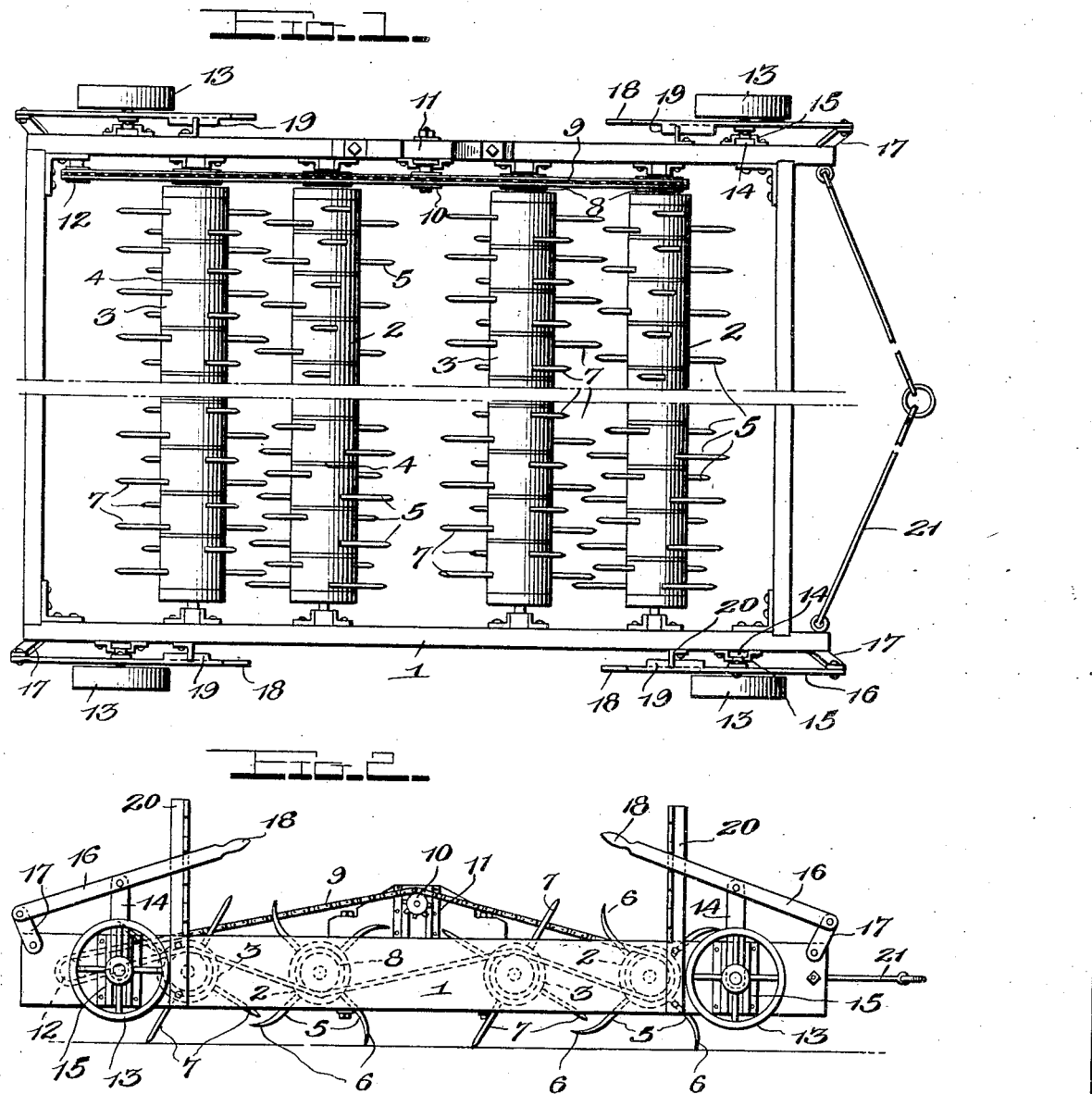

ALMER L. NILSEN, OF WALFORD, NORTH DAKOTA.

REVOLVING DRAG.

1,239,294.          Specification of Letters Patent.          Patented Sept. 4, 1917.

Application filed October 21, 1916. Serial No. 126,879.

*To all whom it may concern:*

Be it known that I, ALMER L. NILSEN, a citizen of the United States, residing at Walford, in the county of Pierce and State of North Dakota, have invented certain new and useful Improvements in Revolving Drags, of which the following is a specification.

This invention relates to certain new and useful improvements in revolving drags and it has for its main object to provide a self-cleaning drag especially adapted for pulverizing the soil and clearing it of quack grass and other foul weeds.

A further aim resides in the provision of a rotary drag having reversely moving cleaners to clear the teeth of the drag and further pulverize the soil which may be between said teeth.

Broadly, the invention comprises a rotating drag member supported in a frame and operatively connected to a series of rotary blades for driving the latter in a reverse direction, and means adjustably supporting the frame to vary the extent of operation of the drag member.

The invention further resides in the features of construction, arrangements and combinations of parts described in detail in the following specification, succinctly defined in the appended claims, and illustrated in its preferred embodiment in the accompanying drawing wherein—

Figure 1 is a fragmentary top plan view of the improved drag; and

Fig. 2 is a side elevation thereof.

Referring more in detail to the drawing, the numeral 1 designates the drag frame of rectangular design in which are journaled the drag rollers 2 and the clearer rollers 3 arranged in alternation with the drag rollers. Each roller preferably comprises a wooden cylinder, bound by metal rings 4 to reinforce the same, and teeth which extend diametrically through the cylinder to project an operative distance on each side. The teeth 5 of the drag rollers have their outer end portions bent or deflected in the direction of travel, as at 6, while the teeth 7 of the clearer rollers are straight and in the form of blades to pass between the teeth 5 to clear the same of quack grass, and other weed, and, further, to cut and pulverize the soil.

A sprocket 8 is fixed on an end of each roller over which takes an endless sprocket chain 9. The upper flight of the chain is supported by an idler 10 which is slidable on a standard 11 for vertical adjustment whereby the chain may be tightened as required. The lower flight takes under the drag roller sprockets and over the clearer roller sprockets and thence over an idler 12 arranged at the rear end of the drag frame. By this arrangement, the clearer rollers are rotated in a direction reverse to that of the drag rollers.

In the preferred form, the rollers are arranged in spaced pairs, having a single clearer roller coöperating with each drag roller thereby simplifying the assemblage and defining the drag into units each of which consists of reversely rotating drag and clearer rollers arranged coöperatively.

For varying the depth at which the drag operates, and also to provide a means by which the drag may be carried from place to place, wheels 13 are journaled on stub shafts projecting outwardly from shoes 14. These shoes are guided for vertical movement in trackways 15, which are fixed on the outer faces of the frame side members, and are controlled, as to extent of movement, by operating levers 16 between the ends of which they are pivotally connected. Swinging fulcrum supports 17 mount one end of each lever to the frame, the opposite lever end being shaped into a handle 18 and formed with a tooth 19 for selective engagement with the teeth of a fixed rack 20 on the frame. Thus by shifting a handle 18 the connected wheel 13 will be correspondingly raised or lowered, so that by proper manipulation, all the wheels may be positioned to support the rollers out of engagement with the ground; to shift the entire weight of the frame on the rollers; or to vary the operating cut of the rollers to a predetermined or desired depth.

A draw attachment 21 is provided on the forward end of the frame by which the drag may be suitably connected to a tractor or horse, in an obvious manner.

What is claimed is:

1. In a rotary drag, a frame having side and end frame members, rollers journaled in the side frame members, a sprocket on one end of each roller, an endless chain arranged adjacent the specified side frame member and taking under one sprocket and over the other to reversely drive the rollers, a vertical standard on said side frame member, and a chain adjusting sprocket vertically adjustable on the standard and supporting the chain.

2. In a revolving drag, a frame, spaced pairs of rollers journaled thereon and each comprising a forward drag roller having rearwardly curved teeth and a rear clearer roller having straight teeth, the teeth of each roller being disposed in staggered relation to each other and to the teeth of the companion roller, and both the clearer and drag rollers operating on the ground, a sprocket on each roller, a chain passing over one sprocket and beneath another sprocket alternately for driving one roller of each pair in a reverse direction from the companion roller, and an idler interposed on the frame between the pairs of rollers.

In testimony whereof I affix my signature.

ALMER L. NILSEN.

Copies of this patent may be obtained for five cents each, by addressing the "Commissioner of Patents, Washington, D. C."